Dec. 13, 1949     E. F. BELL     2,491,074
ROLLER AWNING GUDGEON
Filed Feb. 9, 1948
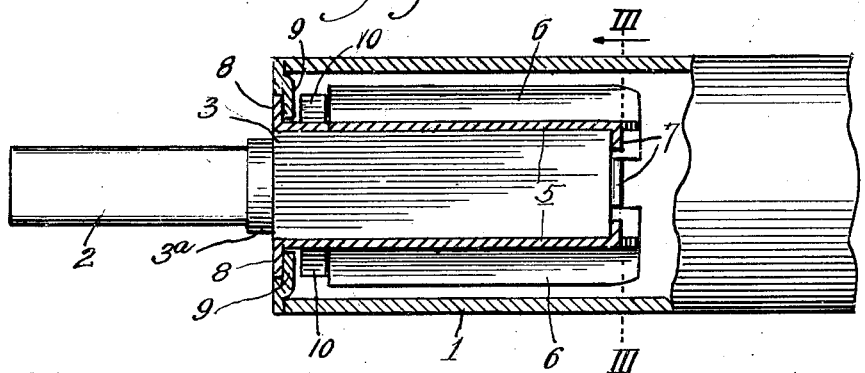
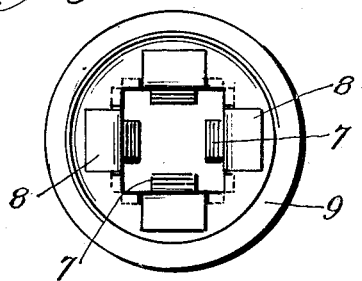
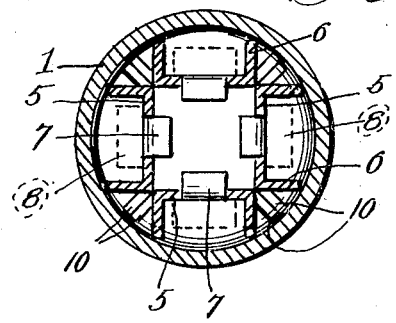
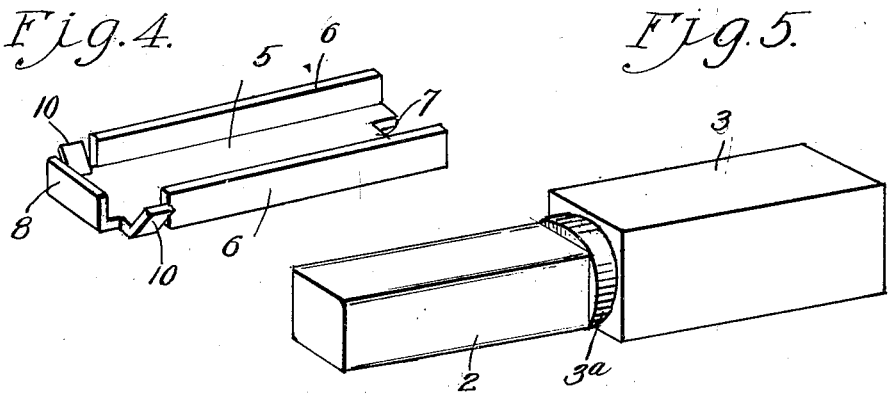
Inventor
*Edwin F. Bell*
By *George H. Thorpe*
Attorney Patented Dec. 13, 1949

2,491,074

UNITED STATES PATENT OFFICE 2,491,074

ROLLER AWNING GUDGEON

Edwin F. Bell, Topeka, Kans.

Application February 9, 1948, Serial No. 7,199

8 Claims. (Cl. 160—326)

This invention relates to gudgeons for the driven ends of rollers of roller awnings, one of the objects being to produce a gudgeon which is self-locking within the inner wall of the pipe roller, the greater the turning force or torque, the tighter the gudgeon grips the pipe.

Another object of the invention is to provide a gudgeon having a closing disk for the open end of the pipe, said disk acting as a carrier or base for the locking or clutch parts of the gudgeon so that the entire assembly is of unitary nature.

With the general objects named in view and others as will hereinafter appear, the invention consists in certain new and useful features of construction and organization of parts as hereinafter described and claimed; and in order that it may be fully understood, reference is to be had to the accompanying drawing, in which—

Figure 1 is a central vertical section through the end of an awning roller equipped with a gudgeon involving the invention.

Figure 2 is an end view of the same.

Figure 3 is a section on the line III—III of Figure 1.

Figure 4 is a perspective view of one of the locking plates showing certain ears bent to the angle they assume when the device has been interlocked with the pipe end-closing disk or plate.

Figure 5 is a perspective view of the rectangular driving pin or shaft.

In the said drawing, where like reference characters identify corresponding parts in all of the figures, 1 is a tubular awning roller, which is adapted to be driven by a square or rectangular shaft or gudgeon 2 which is rotated by any suitable mechanism, not shown. The shaft 2, at an intermediate point, has a circular bearing boss 3a forming the rotative support for the awning roller assembly, the other end of the shaft being rectangular or square as at 3 for driving engagement with a series of clutch or interlocking members hereinafter identified, which come into non-rotative gripping engagement with the inner wall of the roller 1.

The clutch assembly with which the squared end 3 cooperates preferably comprises four identical members having base portions 5 with out-turned gripping flanges 6 along their opposite side edges. The base portions 5 at their inner ends may have inturned ears or flanges 7 to constitute stops limiting the movement of part 3, and at their opposite ends said bases 5 are formed with out-turned flanges or ears 8 which are adapted to fit within a recess formed in the face of a disk 9 of proper diameter to abut and close the end of the roller 1, the formation of said recess simultaneously providing a circumferential centering shoulder contacting the inner wall of the pipe roller.

Disk 9 is formed with a central square or rectangular opening to accommodate the shape of portion 3, and the ears 8 of each of the four clutch members 5 are passed through said opening with an arcuate swinging movement. After the ears 8 have been positioned, ears 10, separated from the flanges 6 by saw kerfs or slits, are bent down to about 45° angles in relation to bases 5, and by abutment with each other and contact with the proximate face of the disk 9, lock the assembly into a flexible, but non-detachable, unit, unless ears 8 or 10 are straightened out, as will be readily understood.

The gudgeon as thus assembled is placed within the end of a pipe roller and the squared end 3 of the drive shaft is slipped between the clutch members 5. Torque applied to the end 2 of the shaft will rotate the assembly on its bearing 3a which causes the part 3 to rock the clutch members 5 forcing their gripping flanges 6 into engagement with the inner wall of the pipe roller, the greater the resistance, the tighter the grip. On reverse movement, the clutch members 5 will rock in the reverse direction and cause gripping of the pipe by the other set of flanges 6, as will be readily understood.

From the above description it will be apparent that I have produced a construction embodying all of the features of advantage set forth as desirable and it is to be understood that I reserve the right to all changes within the spirit and scope of the appended claims.

I claim:

1. A gudgeon mounting for awning rollers comprising a plate formed with a central opening, and a plurality of clutch members projecting through the opening in the plate and interlocked with the plate against separating movement.

2. A gudgeon for awning rollers comprising a plate formed with a central opening, a plurality of clutch members projecting through the opening in the plate, and ears outwardly extending from the clutch members on opposite sides of the plate to retain the clutch members in position in the opening in said plate.

3. An awning roller gudgeon mounting assembly comprising a hollow awning roller, a plate closing the end of said roller and having an opening, a drive shaft projecting through said opening, and clutch means carried by said plate and expanded outwardly by the drive shaft into gripping engagement with the bore of the roller.

4. An awning roller gudgeon assembly comprising a hollow awning roller, a plate closing the end of said roller and having an opening, a rectangular drive shaft projecting through said opening, and clutch means carried by said plate and expanded outwardly by the shaft into awning roller contact.

5. An awning roller gudgeon assembly comprising a hollow awning roller, a plate closing the end of said roller and having a centering shoulder in contact with the inner wall thereof and formed with an opening, a drive shaft projecting through the opening, and clutch means carried by said plate and expanded outwardly by the drive shaft.

6. A gudgeon mounting comprising a plate having a peripheral shoulder for centering engagement with an awning roller and a square center opening, four identical outwardly projecting channel members each engaging one side of the plate opening, and two sets of ears outwardly projecting from each channel member and engaging opposite faces of the plate.

7. A gudgeon mounting comprising a plate having a peripheral shoulder for centering engagement with an awning roller and a rectangular center opening, a plurality of identical outwardly projecting channel members each engaging one side of the opening in the plate, and ears outwardly projecting from the channel members and engaging opposite faces of the plate to hold the assembly together as a unit.

8. A gudgeon mounting comprising a plate having a peripheral shoulder for entering engagement with an awning roller and a rectangular center opening, a plurality of identical outwardly projecting channel members each engaging one side of the opening in the plate, ears outwardly projecting from the channel members and engaging opposite faces of the plate to hold the assembly together as a unit, and a second set of ears projecting inwardly from said channel members.

EDWIN F. BELL.

REFERENCES CITED

The following references are of record in the file of this patent:

UNITED STATES PATENTS

| Number | Name | Date |
|---|---|---|
| 2,427,298 | Morpeth | Sept. 8, 1947 |